(12) United States Patent
Garces

(10) Patent No.: US 11,227,198 B2
(45) Date of Patent: Jan. 18, 2022

(54) INFORMATION PROCESSING APPARATUS AND IMAGE FORMING APPARATUS FOR GENERATING SANS-SERIF CHARACTER DATA AND SERIF CHARACTER DATA

(71) Applicant: KYOCERA Document Solutions Inc., Osaka (JP)

(72) Inventor: Patricia Ysabel Garces, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/062,883

(22) Filed: Oct. 5, 2020

(65) Prior Publication Data

US 2021/0117740 A1   Apr. 22, 2021

(30) Foreign Application Priority Data

Oct. 16, 2019  (JP) .............................. JP2019-189511

(51) Int. Cl.
*G06K 15/02*  (2006.01)

(52) U.S. Cl.
CPC ..... *G06K 15/1827* (2013.01); *G06K 15/1802* (2013.01); *G06K 15/1836* (2013.01)

(58) Field of Classification Search
CPC .................................................. G06K 15/1827
USPC ........................................................ 358/1.15
See application file for complete search history.

(56) References Cited

U.S. PATENT DOCUMENTS

| | | | |
|---|---|---|---|
| 6,426,751 B1 * | 7/2002 | Patel ..................... | G06F 40/109 345/468 |
| 8,682,042 B1 * | 3/2014 | Manion .................. | G16H 40/67 382/128 |
| 10,878,172 B1 * | 12/2020 | Adamson, III ....... | G06F 40/106 |

FOREIGN PATENT DOCUMENTS

JP    2018-022972    2/2018

* cited by examiner

*Primary Examiner* — Jacky X Zheng
(74) *Attorney, Agent, or Firm* — Lex IP Meister, PLLC

(57) ABSTRACT

An information processing apparatus includes a storage unit and a processor. A font file includes type face data and serif data. When a sans-serif font is selected, the processor generates sans-serif character data on the basis of the type face data. When a serif font selected, the processor generates sans-serif character data, generates serif image data, and adds generated the serif image data to generated the sans-serif character data to generate serif character data.

8 Claims, 16 Drawing Sheets

FIG. 8

ABCDEFGHIJKLMN
OPQRSTUVWXYZ
abcdefghijklmn
opqrstuvwxyz

ADD VERTICAL SERIF

FIG. 11

ABCDEFGHIJKLMN
OPQRSTUVWXYZ
abcdefghijklmn
opqrstuvwxyz

FIG. 14

ABCDEFGHIJKLMN
OPQRSTUVWXYZ
abcdefghijklmn
opqrstuvwxyz

INFORMATION PROCESSING APPARATUS AND IMAGE FORMING APPARATUS FOR GENERATING SANS-SERIF CHARACTER DATA AND SERIF CHARACTER DATA

INCORPORATION BY REFERENCE

This application is based upon, and claims the benefit of priority from, corresponding Japanese Patent Application No. 2019-189511 filed in the Japan Patent Office on Oct. 16, 2019, the entire contents of which are incorporated herein by reference.

BACKGROUND

Field of the Invention

The present disclosure relates to an information processing apparatus and an image forming apparatus that perform a rasterizing process to generate image data of a character.

Description of Related Art

Computers and image forming apparatuses store font data. These apparatuses generate character image data on the basis of the font data, and perform screen display and printing with the use of the generated character image data.

When the rasterizing process (drawing process) of a page including a character is performed, the character is converted into an image. For example, when browsing a web page, image data of a character of a font specified in HTML, a font described in CSS, or a font specified in the browser is generated. A web page containing a character is displayed on a display on the basis of the generated character image data.

Alphabet fonts include fonts with a serif. The serif is a decoration at the end of a line (stroke) of a character. Serif fonts include, for example, Bodoni and Times New Roman. On the other hand, there are also fonts without the serif. No serif is sometimes called sans-serif. "Sans" is a French word, meaning "without". In Japan, fonts without the serif are sometimes referred to as Gothic. Sans-serif fonts include, for example, Arial.

One font family may include a serif font and a sans-serif font. In this case, font data of serifs and font data of sans-serifs are created separately. Even if many of the shapes of characters are common, font data is defined separately. The total size of each font data may be large.

SUMMARY

An information processing apparatus according to the present disclosure includes a storage unit and a processor. The storage unit stores a font file including type face data and serif data. When a sans-serif font corresponding to the font file is selected in advance, the processor generates sans-serif character data which is image data of a sans-serif character on the basis of the type face data. When a serif font corresponding to the font file is selected in advance, the processor generates serif image data. The processor adds the serif image data to the sans-serif character data generated on the basis of the type face data to generate serif character data. The processor outputs the generated character image data. The type face data includes, for each character, a drawing definition for drawing a sans-serif character. The serif data is data in which the type of a serif to be added and the position at which the serif is to be added are defined for each character. The serif character data is the image data of a serif character.

In addition, an image forming apparatus according to the present disclosure includes a printer, a storage unit, and a controller. The storage unit stores a font file including type face data and serif data. When a sans-serif font corresponding to the font file is selected in advance, the controller generates sans-serif character data which is image data of a sans-serif character on the basis of the type face data. When a serif font corresponding to the font file is selected in advance, the controller generates serif image data. The controller adds the serif image data to the sans-serif character data generated on the basis of the type face data to generate serif character data. The controller prints out the generated character image data. The type face data includes, for each character, a drawing definition for drawing a sans-serif character. The serif data is data in which the type of a serif to be added and the position at which the serif is to be to added are defined for each character.

BRIEF DESCRIPTION OF THE DRAWINGS

FIG. 8 is a diagram illustrating an example of adding a horizontal serif according to the embodiment;

FIG. 11 is a diagram illustrating an example of adding a vertical serif according to the embodiment;

FIG. 14 is a diagram illustrating an example of adding an ear-serif according to the embodiment;

DETAILED DESCRIPTION

Hereinafter, embodiments of the present disclosure will be described with reference to FIGS. 1 to 17. Elements such as configurations and arrangements that are described in the present embodiment do not limit the scope of the disclosure, and are simply illustrative examples.

(Information Processing Apparatus 100)

Figure 1:
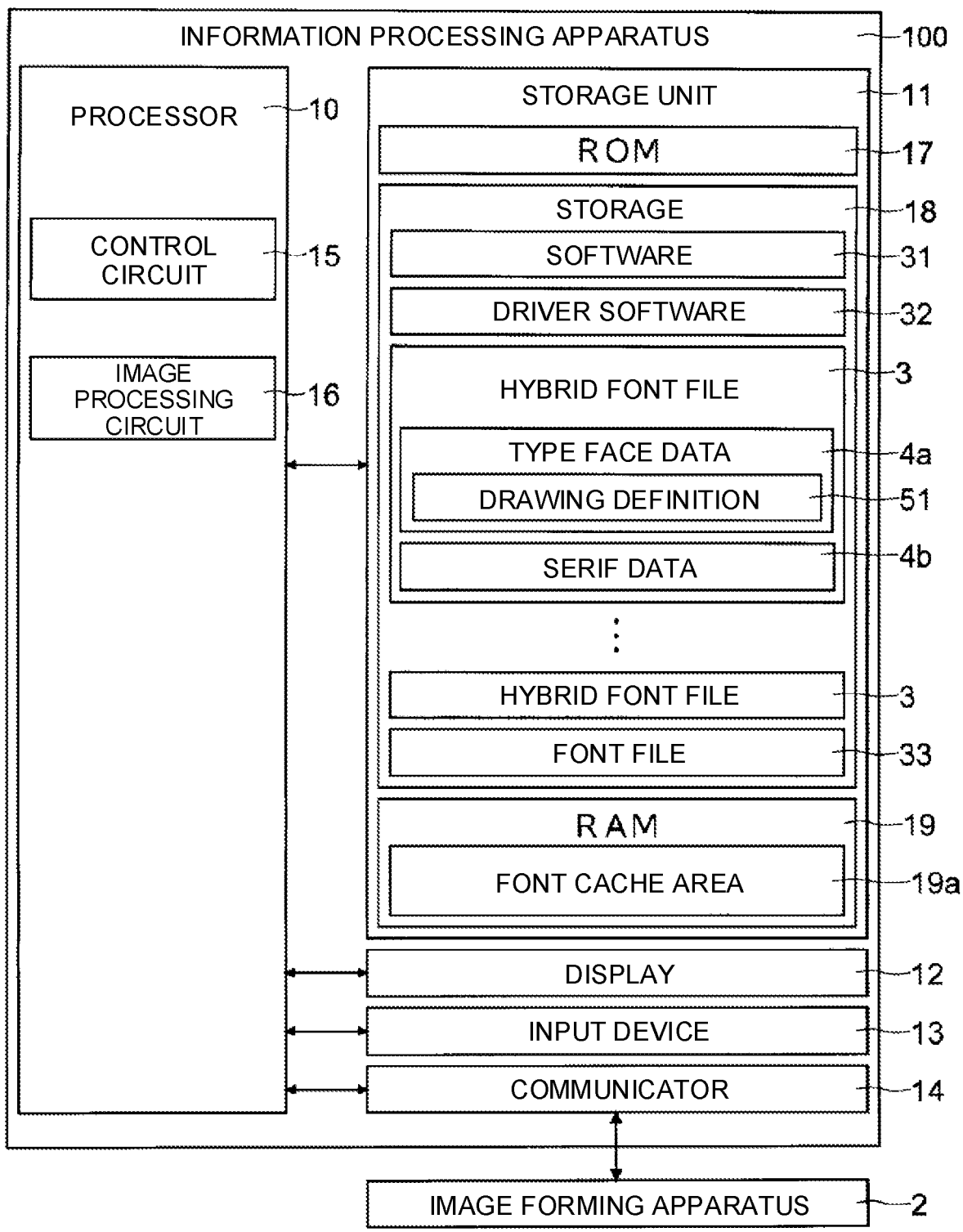
FIG. 1 illustrates an example of an information processing apparatus according to an embodiment.

An example of an information processing apparatus 100 according to an embodiment will be described with the use of FIG. 1. FIG. 1 is a diagram illustrating an example of the information processing apparatus 100 according to the embodiment.

The information processing apparatus 100 is a computer. The information processing apparatus 100 is, for example, a PC. The information processing apparatus 100 may be a smart phone or a tablet terminal. The information processing apparatus 100 includes a processor 10, a storage unit 11, and a display 12, an input device 13, and a communicator 14.

The processor 10 controls the operation of the information processing apparatus 100. For example, the processor 10 is a board including a control circuit 15 and an image processing circuit 16. The control circuit 15 is, for example, a CPU. The processor 10 controls the operation of information processing apparatus 100 on the basis of an OS, software, and data. The storage unit 11 includes a ROM 17, a storage 18 (for example, an HDD, and may be an SSD), and a RAM 19. The storage unit 11 stores the OS, programs, software, and data of the information processing apparatus 100 in a non-volatile manner. The processor 10 controls each unit of the information processing apparatus 100 in accordance with the content stored in the storage unit 11.

The processor 10 displays various information on the display 12. The display 12 includes a liquid crystal display panel or an organic EL display panel. The input device 13 accepts user operations. The input device 13 is connected to the processor 10. The input device 13 is, for example, a keyboard and a mouse. The communicator 14 includes a communication circuit and communication software. The communicator 14 communicates with an image forming apparatus 2 in accordance with an instruction from the processor 10. When printing on the image forming apparatus 2, the communicator 14 transmits print job data to the image forming apparatus 2.

As illustrated in FIG. 1, the storage unit 11 of the information processing apparatus 100 stores a hybrid font file 3, software 31, and driver software 32 in a non-volatile manner. For example, the hybrid font file 3, the software 31, and the driver software 32 are installed in the storage 18.

The software 31 is for creating and editing a file. The software 31 is, for example, word processing software, spreadsheet software, image data editing software, or browser software. The processor 10 causes the display 12 to display the content of a file to be created and edited (a file opened with the use of the software 31).

The driver software 32 is the software for causing the image forming apparatus 2 to print. When a user wants to print a file, the user executes a print command. The input device 13 accepts the input of the print command. When the print command is input, the processor 10 generates print job data on the basis of the driver software 32. The processor 10 causes the communicator 14 to transmit the generated print data to the image forming apparatus 2. The image forming apparatus 2 performs printing (print job) on the basis of the received print job data.

The hybrid font file 3 is the data used to generate image data of a character. In addition to characters, it is also possible to generate image data of numbers and symbols. The characters are, for example, alphabetic characters. A plurality of hybrid font files 3 may be stored in the storage unit 11 (storage 18).

The hybrid font file 3 includes type face data (glyph data) 4a and serif data 4b. Because of including the type face data 4a and serif data 4b, the hybrid font file 3 supports both serifs and sans-serifs (details will be described later). On the basis of one hybrid font file 3, it is possible to generate image data of a serif character, and it is also possible to generate image data of a sans-serif character. The storage unit 11 may store a font file 33 (conventional font data) that does not support both serifs and sans-serifs.

The type face data 4a includes, for each character, a drawing definition 51 for drawing a sans-serif character (outline of a character). For example, the type face data 4a includes a drawing definition 51 of at least an uppercase alphabetic character, a lowercase alphabetic character, each number, and each symbol. When generating image data of a character, the processor 10 (image processing circuit 16) generates the image data of the character with the use of the drawing definition 51 of the type face data 4a. For example, the generated image data is used to display and output a character on the display 12. Specifically, when a document file created by word processing software is opened, the processor 10 generates the image data of a character included in the document file. The processor 10 causes the display 12 to display the content of the document file, on the basis of the generated character image data.

(Generation of Sans-Serif Character Data 5)

Figure 2:
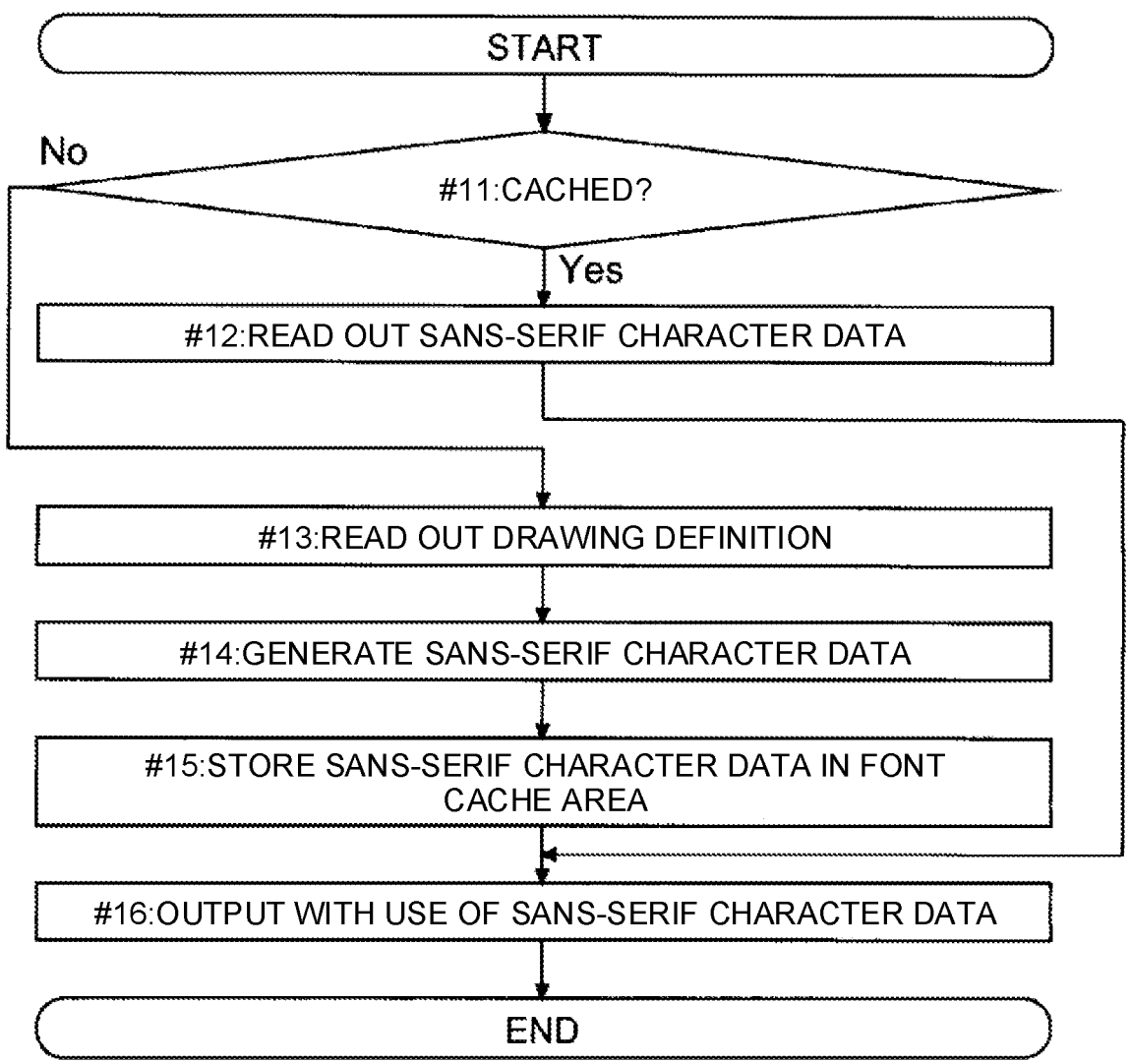
FIG. 2 is a flowchart illustrating an example of a process for generating sans-serif character data by the information processing apparatus according to the embodiment.
Figure 3:
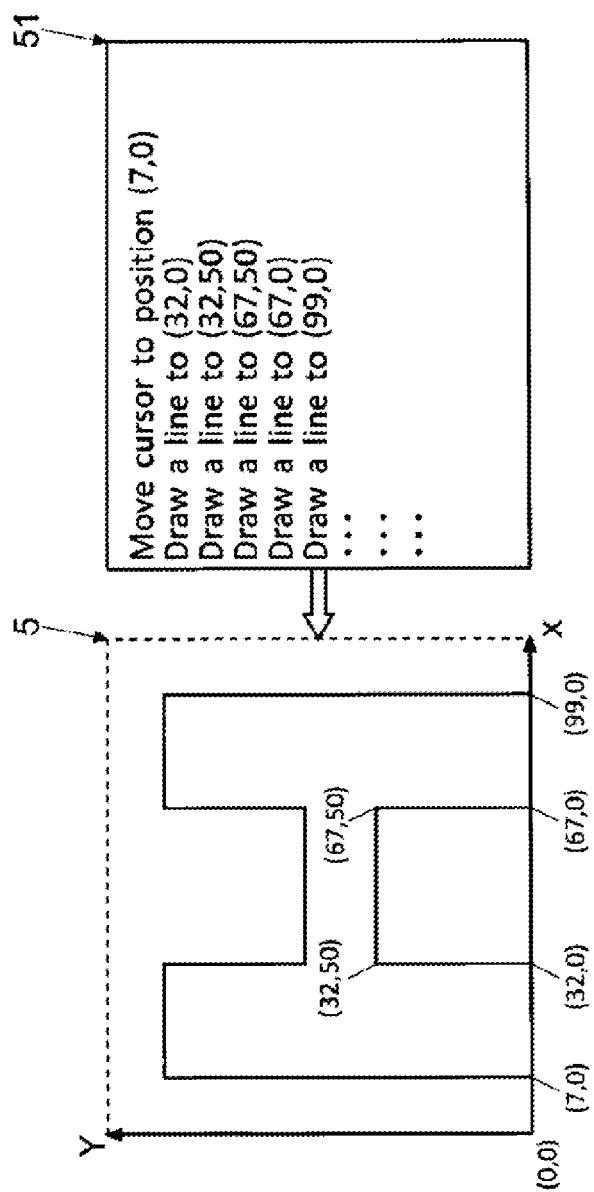
FIG. 3 is a diagram illustrating an example of a process for generating sans-serif character data by the information processing apparatus according to the embodiment.

Next, an example of a process for generating san-serif character data 5 by the information processing apparatus 100 according to the embodiment will be described with the use of FIG. 2. FIGS. 2 and 3 are diagrams illustrating an example of a process for generating the sans-serif character data 5 by the information processing apparatus 100 according to the embodiment.

Usually, font data of sans-serif fonts and font data of serif fonts are separate from each other. A serif is a small decoration at the end of a character. A font with a serif is sometimes referred to as serif. A font without a serif is sometimes referred to as sans-serif.

The processor 10 (image processing circuit 16) can generate image data of a sans-serif character on the basis of the type face data 4a of the hybrid font file 3. In the following description, the image data of a sans-serif character is referred to as the sans-serif character data 5.

Furthermore, the processor 10 (image processing circuit 16) can generate image data in which a serif is added to a sans-serif character, as image data of a serif character. In the following description, the image data of a serif character is referred to as serif character data 6.

First, an example of the flow of generating the sans-serif character data 5 will be described with the use of FIGS. 2 and 3. The start of FIG. 2 is the time when preparation of the sans-serif character data 5 of a certain character is started for display or printing. In the start of FIG. 2, the selection for the use of the font of the hybrid font file 3 is made beforehand. For example, in word processing software, a font to be used can be selected. The input device 13 accepts the selection of the font. In addition, the font to be used may be selected on some web pages. In the start of FIG. 2, sans-serif is selected in advance from sans-serif and serif. The process of the flowchart in FIG. 2 is executed for one character at a time.

The processor 10 (control circuit 15) confirms whether the sans-serif character data 5 of the character to be prepared is stored in a font cache area 19a (step #11). The font cache area 19a is an area for caching the sans-serif character data 5. The processor 10 allocates, for example, a part of the RAM 19 as the font cache area 19*a*. A part of a storage area for a cache memory other than the RAM 19 may be assigned as font cache area 19*a*.

If the sans-serif character data 5 is cached (Yes in step #11), the processor 10 reads out the sans-serif character data 5 in the font cache area 19*a* (step #12). On the other hand, if the sans-serif character data 5 is not cached (No in step #11), the processor 10 (control circuit 15) reads out, from the type face data 4*a*, the drawing definition 51 of a character for which the sans-serif character data 5 is to be generated (step #13). In other words, the processor 10 reads out the drawing definition 51 of a character for which the sans-serif character data 5 is to be generated, from the type face data 4*a* of the hybrid font file 3 corresponding to the selected font.

The processor 10 (image processing circuit 16) performs drawing on the basis of the read-out drawing definition 51 to generate the sans-serif character data 5 (step #14). FIG. 3 illustrates an example of the drawing definition 51 (type face data 4*a*) for the H character of a certain font and a drawing process based on the drawing definition 51. The drawing definition 51 illustrated in FIG. 3 includes a description (definition) of a plurality of coordinates. The processor 10 (image processing circuit 16) draws a line connecting the defined coordinates. There are characters that include curves. For such characters, a formula for drawing a curve (Bezier curve) is defined as the drawing definition 51. The processor 10 draws the outline of the character on the basis of the coordinates and the formula. The processor 10 draws the outline of the character and then paints the inside of the outline. Then, the processor 10 (image processing circuit 16) stores the generated sans-serif type character data 5 in the font cache area 19*a* (step #15).

The processor 10 outputs the read-out or generated sans-serif character data 5 (step #16). Then, this flow ends (end). For example, the processor 10 causes the display 12 to display a character base on the generated sans-serif character data 5. The processor 10 may perform size adjustment (enlargement or reduction) of the sans-serif character data 5 in accordance with a font size set with the use of the input device 13. In this case, the processor 10 causes the display 12 to display the sans-serif character data 5 after the size adjustment.

(Generation of Serif Character Data 6)

Figure 4:
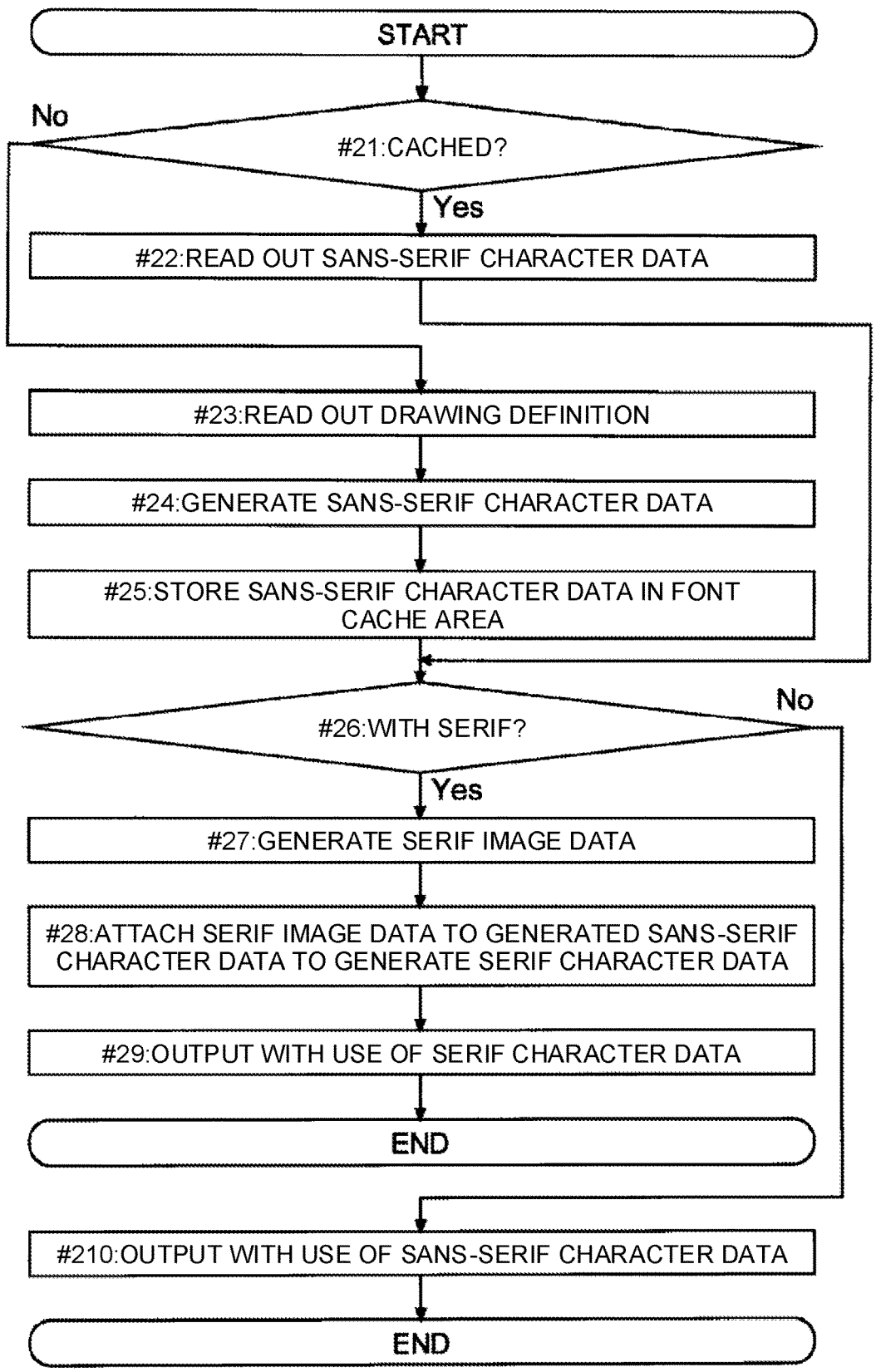
FIG. 4 is a flowchart illustrating an example of a process for generating sans-serif character data by the information processing apparatus according to the embodiment.

Next, an example of a process for generating the serif character data 6 by the information processing apparatus 100 according to the embodiment will be described with the use of FIG. 4. FIG. 4 is a flowchart illustrating an example of a process for generating the serif character data 6 by the information processing apparatus 100 according to the embodiment.

An example of the flow of generating the serif character data 6 will be described with the use of FIG. 4. The start of FIG. 4 is the time when preparation of the serif character data 6 of a certain character is started for display or printing. In the start of FIG. 4, the font of the hybrid font file 3 is selected in advance as the font to be used. In addition, in the start of FIG. 4, a serif font is selected in advance from sans-serif and serif. The process of the flowchart in FIG. 4 is executed for one character at a time.

The processor 10 (control circuit 15) confirms whether the sans-serif character data 5 of the character to be prepared is stored in the font cache area 19*a* (step #21). For example, in a case where the serif character data 6 of a character A is prepared, the processor 10 confirms whether the sans-serif character data 5 of the character A is cached. If the sans-serif character data 5 of the character A is cached (Yes in step #21), the processor 10 reads out the sans-serif character data 5 in the font cache area 19*a* (step #22).

On the other hand, when the sans-serif character data 5 of the character A is not cached (No in step #21), the processor 10 (control circuit 15) reads out the drawing definition 51 of the character to be prepared, from the type face data 4*a* (step #23). The processor 10 reads out the drawing definition 51 of the character to be generated, from the type face data 4*a* of the hybrid font file 3 corresponding to the selected font. The processor 10 (image processing circuit 16) performs drawing on the basis of the read-out drawing definition 51 to generate the sans-serif character data 5 (step #24, same as step #14 of FIG. 2). The processor 10 stores the generated sans-serif character data 5 in the font cache area 19*a* (step #25).

The processor 10 confirms whether the character of the read-out or generated sans-serif character data 5 is a serif character (step #26). Even in a serif font, there is a case where no serif is added (not set) to symbols in a narrow sense, such as the uppercase letters O and Q, and lowercase letters e, g, o, and t of the alphabet, numbers, and a question mark.

In the case of a serif character (Yes in step #26), the processor 10 (image processing circuit 16) generates serif image data on the basis of the serif data 4*b* (step #27). The hybrid font file 3 includes the drawing definition 51 for drawing the serif image data. The processor 10 adds the generated serif image data to the generated sans-serif character data 5 to generate serif character data 6 (step #28).

The generated serif image data may be stored in the font cache area 19*a*. If necessary serif image data is cached, the processor 10 may skip step #27 without generating the serif image data. The processor 10 may generate the serif character data 6 with the use of the cached serif image data.

The processor 10 (control circuit 15) outputs the generated serif character data 6 (step #29). Then, this flow ends (end). For example, the processor 10 causes the display 12 to display the generated serif character data 6. The processor 10 may perform size adjustment (enlargement or reduction) of the serif character data 6 in accordance with the font size selected by the input device 13. On the other hand, in the case of a sans-serif character (No in step #26), the processor 10 outputs the read-out or generated sans-serif character data 5 (step #210). Then, this flow ends (end).

(Horizontal Serif)

Figure 5:
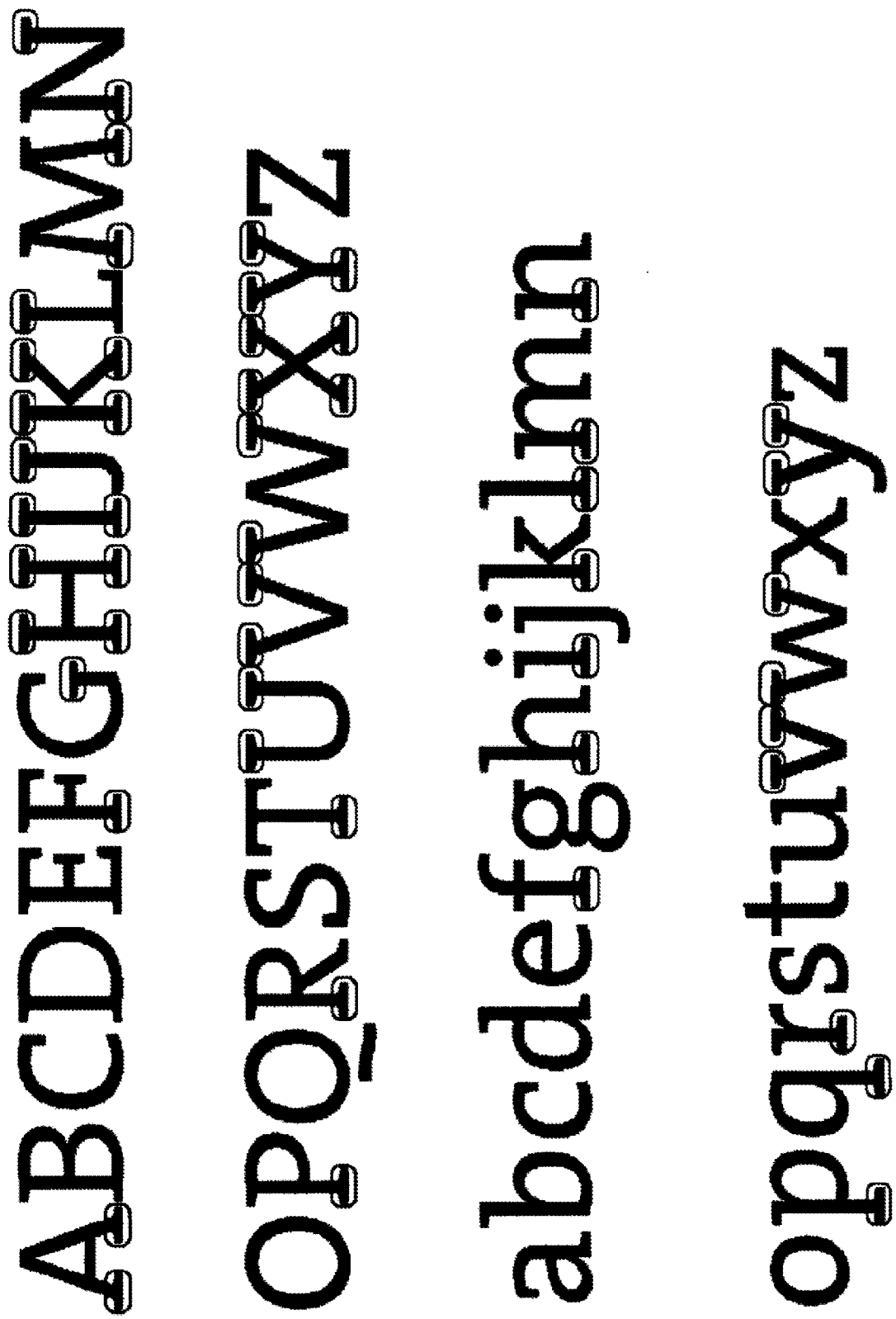
FIG. 5 is a diagram illustrating an example of a process for generating serif character data by the information processing apparatus according to the embodiment.
Figure 6:
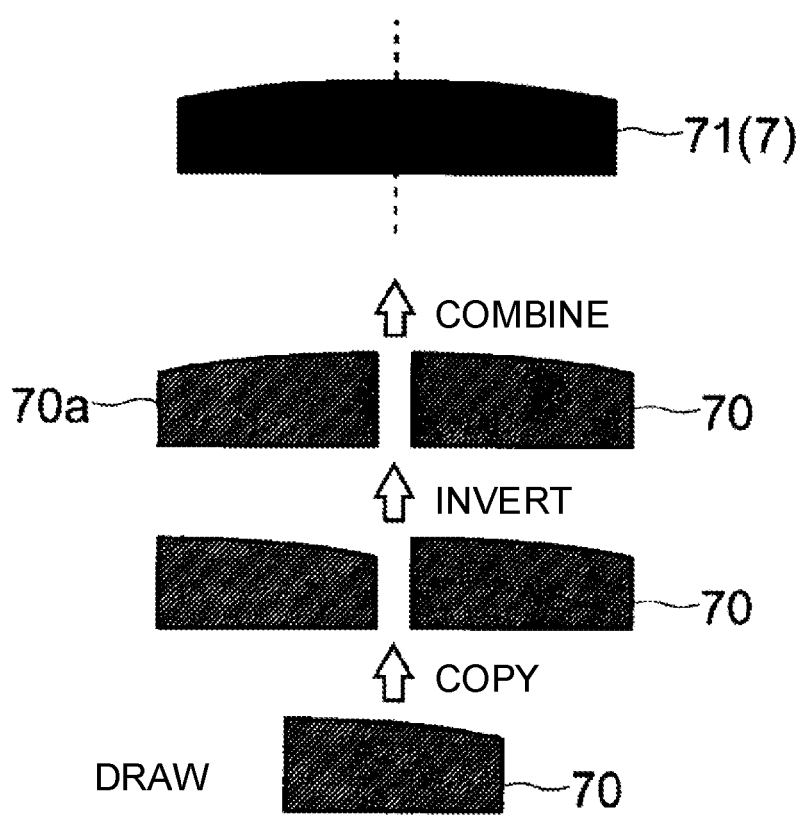
FIG. 6 is a diagram illustrating an example of a character to which a horizontal serif according to the embodiment is added.
Figure 7:
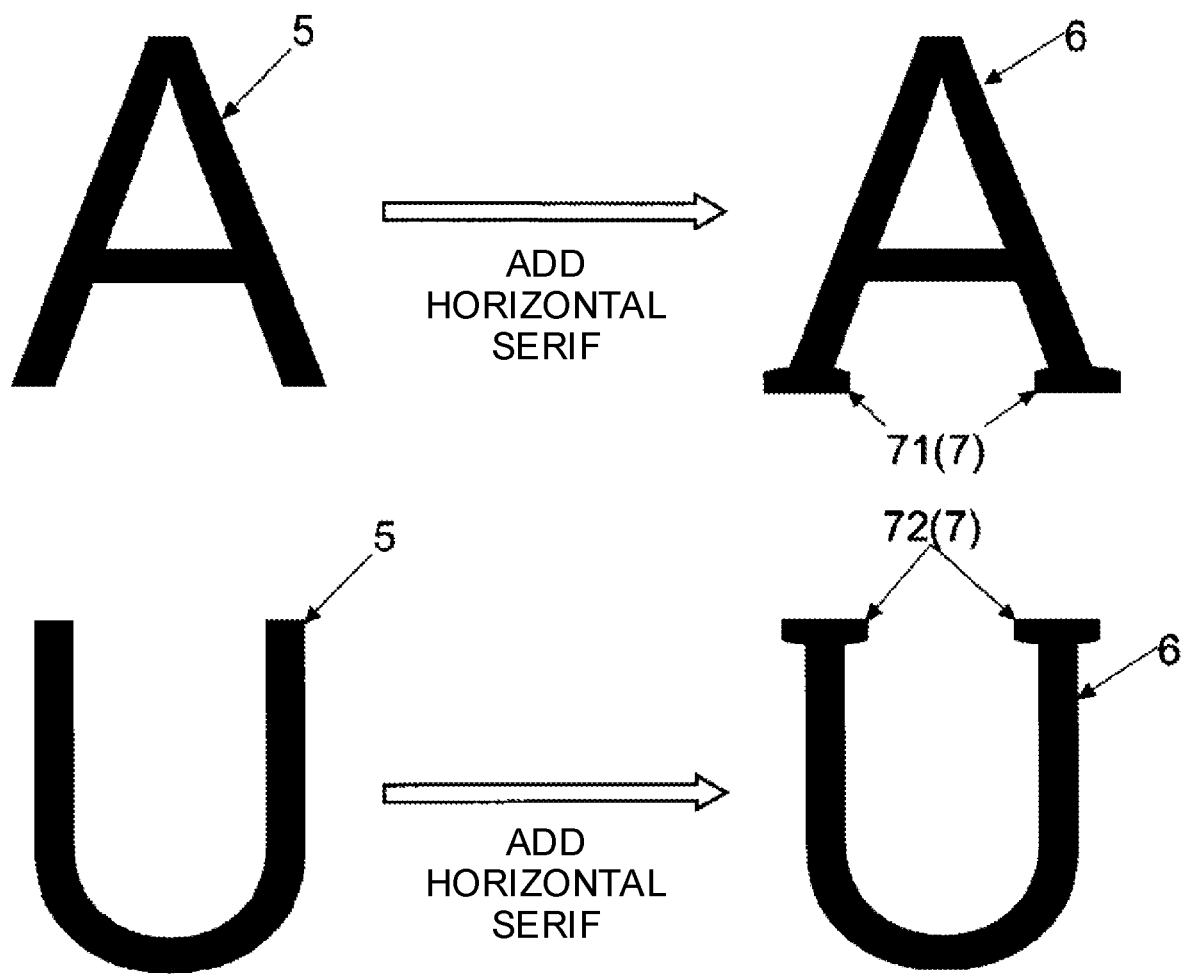
FIG. 7 is a diagram illustrating an example of adding a horizontal serif according to the embodiment.

Next, an example of adding a horizontal serif, which is one type of serif according to the embodiment, will be described with the use of FIGS. 5 to 7. FIG. 5 is a diagram illustrating an example of a character to which a horizontal serif according to the embodiment is added. FIGS. 6 and 7 are diagrams illustrating an example of adding a horizontal serif according to the embodiment.

A font designer determines what kind of serif is added to which position in the character. Depending on the designer, the position where the serif is added and the type of serif may be different. The hybrid font file 3 includes the serif data 4*b*. The serif data 4*b* is data that defines, for each character, the presence or absence of a serif, the position where serif image data is added, and the type of serif added to that position. The designer defines the serif data 4*b* on the basis of a design.

FIG. 5 illustrates an example of characters (alphabet) of a serif font. A horizontal serif is a serif that protrudes in both the right and left directions (horizontal direction) from the end of the line (stroke) of a character. In FIG. 5, the horizontal serif part is enclosed by an ellipse. The horizontal serif includes a lower end horizontal serif and an upper end horizontal serif. The lower end horizontal serif is a horizontal serif added to the lower end of the line (stroke). The upper end horizontal serif is a horizontal serif added to the upper end of the line (stroke). Depending on the design, the lower end horizontal serif and the upper end horizontal serif may be the same (for example, unified with a rectangle).

When adding the horizontal serif, the processor 10 (image processing circuit 16) generates horizontal serif image data 7. The horizontal serif image data 7 includes lower end horizontal serif image data 71 and upper end horizontal serif image data 72. The processor 10 uses the lower end horizontal serif image data 71 as a reference. The processor 10 generates the lower end horizontal serif image data 71 and then the upper end horizontal serif image data 72. The uppermost figure of FIG. 6 illustrates an example of the lower end horizontal serif image data 71.

The lower side of the lower end horizontal serif in FIG. 6 is parallel to the right-left direction. In addition, the left side and the right side are both parallel to the top, bottom, left, and right. The upper side connects the upper end of the left side and the upper end of the right side, and is a gentle curve that protrudes upward. The lower end horizontal serif is a figure in which the upper left corner and the upper right corner of a rectangle whose right-left direction is the longitudinal direction are rounded.

When generating the lower end horizontal serif image data 71, the processor 10 (image processing circuit 16) generates image data of a predefined bisection image (bisection image data 70). The hybrid font file 3 includes the drawing definition 51 for drawing the bisection image data 70. The bisection image is an image obtained by vertically dividing the lower end horizontal serif image data 71 into two at the center in the right-left direction (horizontal direction). The figure illustrated at the bottom of FIG. 6 is the bisection image data 70. The bisection image data 70 in FIG. 6 is the right half of the lower end horizontal serif image data 71.

After generating the bisection image data 70, the processor 10 (image processing circuit 16) copies the bisection image data 70. The processor 10 performs a mirror process (right-left inversion) of the copied bisection image data 70. The processor 10 combines the bisection image data 70 and a copy of the image data of the inverted bisection image (inverted image data 70*a*). Then, the processor 10 generates the lower end horizontal serif image data 71. The processor 10 combines the bisection image data 70 and the inverted image data 70*a* in such a manner that the lower sides become a straight line. The processor 10 combines the left side of the bisection image and the right side of the inverted bisection image in such a manner that they are adjacent to each other.

Some characters have a horizontal serif added to the upper end of a line (stroke, stem) (for example, U in the alphabet). In this case, the processor 10 (image processing circuit 16) rotates the lower end horizontal serif image data 71 by 180 degrees to generate the upper end horizontal serif image data 72. The upper side of the upper end horizontal serif illustrated in FIG. 6 is parallel to the right-left direction. In addition, the left side and the right side are both parallel to the top, bottom, left, and right. The lower side connects the lower end of the left side and the lower end of the right side, and is a gentle curve that protrudes downward. The lower end horizontal serif is a figure in which the lower left corner and the lower right corner of a rectangle whose right-left direction is the longitudinal direction are rounded.

The above method for generating the horizontal serif image data 7 is an example. The processor 10 (image processing circuit 16) may directly draw the lower end horizontal serif to generate the lower end horizontal serif image data 71 without performing the inversion and rotation processes. In addition, the processor 10 (image processing circuit 16) may directly draw the upper end horizontal serif to generate the upper end horizontal serif image data 72. Moreover, the shape of the horizontal serif is not limited to the above. The horizontal serif may be rectangular. The horizontal serif may be a wave shape.

The upper figure in FIG. 7 illustrates an example of adding a lower end horizontal serif to the lower ends of the two diagonal lines of a sans-serif uppercase letter A. The processor 10 (image processing circuit 16) pastes the lower end horizontal serif image data 71 to the sans-serif character data 5 of the uppercase letter A to generate the serif character data 6. The lower figure of FIG. 7 illustrates an example of adding the upper end horizontal serif to the ends of the curve of a sans-serif uppercase letter U. The processor 10 (image processing circuit 16) pastes the upper end horizontal serif image data 72 to the sans-serif character data 5 of the uppercase letter U to generate the serif character data 6.

In the case of the uppercase letter A illustrated in FIG. 7, the lower end horizontal serif is defined in the serif data 4*b* as the type of a serif to be pasted to the letter A. Of the sans-serif character data 5 of the uppercase letter A, the lower ends of two diagonal lines are defined as the positions to paste the lower end horizontal serifs.

As the positions, the coordinates in the sans-serif character data 5 (first reference coordinates) and the coordinates of the horizontal serif image data 7 (second reference coordinates) are defined. When pasting the serif image data, the processor 10 (image processing circuit 16) superimposes the defined second reference coordinates on the defined first reference coordinates. Respective coordinates are set in advance in such a manner that serif characters are properly reproduced and that horizontal serifs are properly added.

The processor 10 (image processing circuit 16) may store the generated lower end horizontal serif image data 71 and upper end horizontal serif image data 72 in the font cache area 19*a*. Once the lower end horizontal serif image data 71 and upper end horizontal serif image data 72 are generated, the processor 10 may add the horizontal serif image data 7 read out from the font cache area 19*a* to the sans-serif character data 5 without generating each horizontal serif image data 7.

(Vertical Serif)

Figure 9:
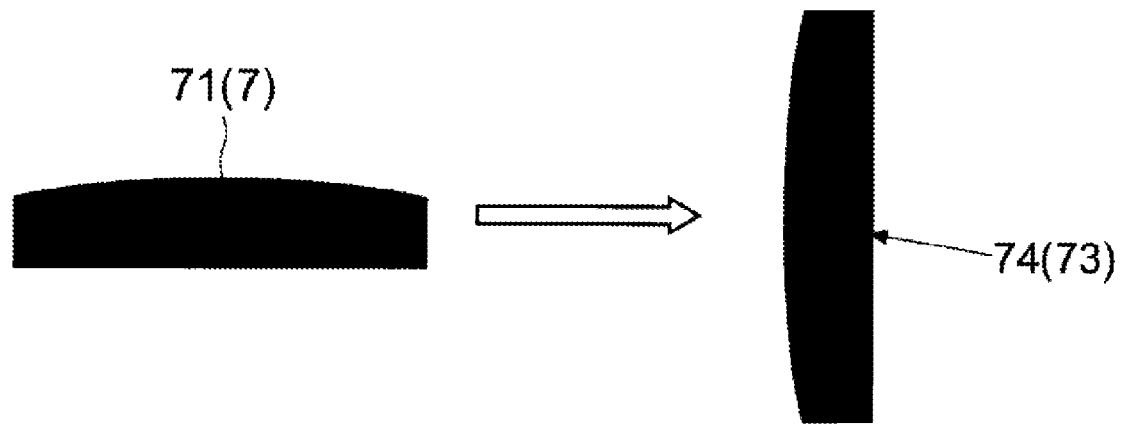
FIG. 9 is a diagram illustrating an example of a character to which a vertical serif according to the embodiment is added.
Figure 10:
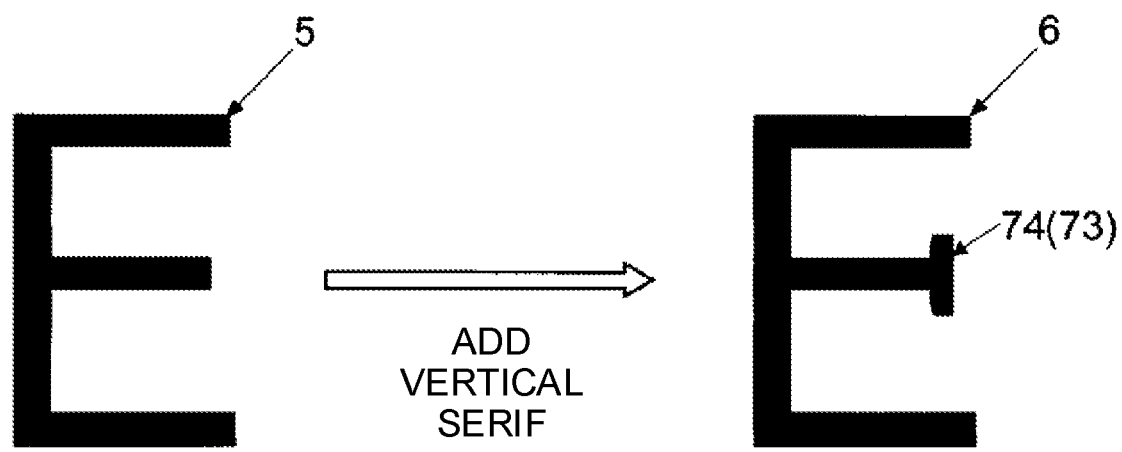
FIG. 10 is a diagram illustrating an example of adding a vertical serif according to the embodiment.

Next, an example of adding a vertical serif, which is one type of serif according to the embodiment, will be described with the use of FIGS. 8 to 10. FIG. 8 is a diagram illustrating an example of a character to which a vertical serif according to the embodiment is added. FIGS. 9 and 10 are diagrams illustrating an example of adding a vertical serif according to the embodiment.

For a character with a vertical serif, the position where vertical serif image data 73 is added and the type of the vertical serif to be added are defined in the serif data 4*b*. A vertical serif is a serif that protrudes in both the up and down directions from the end of the line (stroke) of a character. FIG. 8 illustrates an example of characters of a serif font. In FIG. 8, the vertical serif part added to a character is enclosed by an ellipse.

When adding the vertical serif, the processor 10 (image processing circuit 16) generates the vertical serif image data 73. For example, the processor 10 rotates the upper end horizontal serif image data 71 or the upper end horizontal serif image data 72 by 90 degrees to generate the vertical serif image data 73. The figure on the right side of FIG. 9 illustrates an example of vertical serif image data (right end vertical serif image data 74) to be added to the right end of the line (stroke) of a character.

The processor 10 (image processing circuit 16) may directly draw a vertical serif to generate the vertical serif image data 73 without using the horizontal serif image data 7. In addition, the shape of a vertical serif is not limited to the above. The vertical serif may be rectangular. The vertical serif may be a wave shape.

The right side of the right end vertical serif in FIG. 9 is parallel to the up and down direction. In addition, the upper side and the lower side are both parallel to the right-left direction. The left side connects the left end of the upper side and the left end of the lower side, and is a gentle curve that protrudes leftward. The right end vertical serif is a figure in which the upper left corner and the lower left corner of a rectangle whose up and down direction is the longitudinal direction are rounded.

FIG. 10 illustrates an example of adding a right end vertical serif to a sans-serif uppercase letter E. The processor 10 (image processing circuit 16) pastes the right end vertical serif image data 74 to the sans-serif character data 5 of the uppercase letter E to generate the serif font character data 6. In the uppercase letter E illustrated in FIG. 10, the right end vertical serif is defined in the serif data 4b as the type of a serif to be pasted to the uppercase letter E. In addition, of the sans-serif character data 5 of the uppercase letter E, the right end of the middle line of the three lines in the right-left direction is defined as the position to paste the right end vertical serif image data 74.

Even in the case of a vertical serif, as the positions, the coordinates in the sans-serif character data 5 (first reference coordinates) and the coordinates of the vertical serif image data 73 (second reference coordinates) are defined. When pasting the serif image data, the processor 10 (image processing circuit 16) superimposes the defined second reference coordinates on the defined first reference coordinates. Respective coordinates are set in advance in such a manner that serif characters are properly reproduced and that vertical serifs are properly added.

The processor 10 (image processing circuit 16) may store the generated vertical serif image data 73 in the font cache area 19a. Once the vertical serif image data 73 is generated, the processor 10 may add the horizontal serif image data 7 read out from the font cache area 19a to the sans-serif character data 5 without generating the vertical serif image data 73.

(Ear-Serif)

Figure 12:
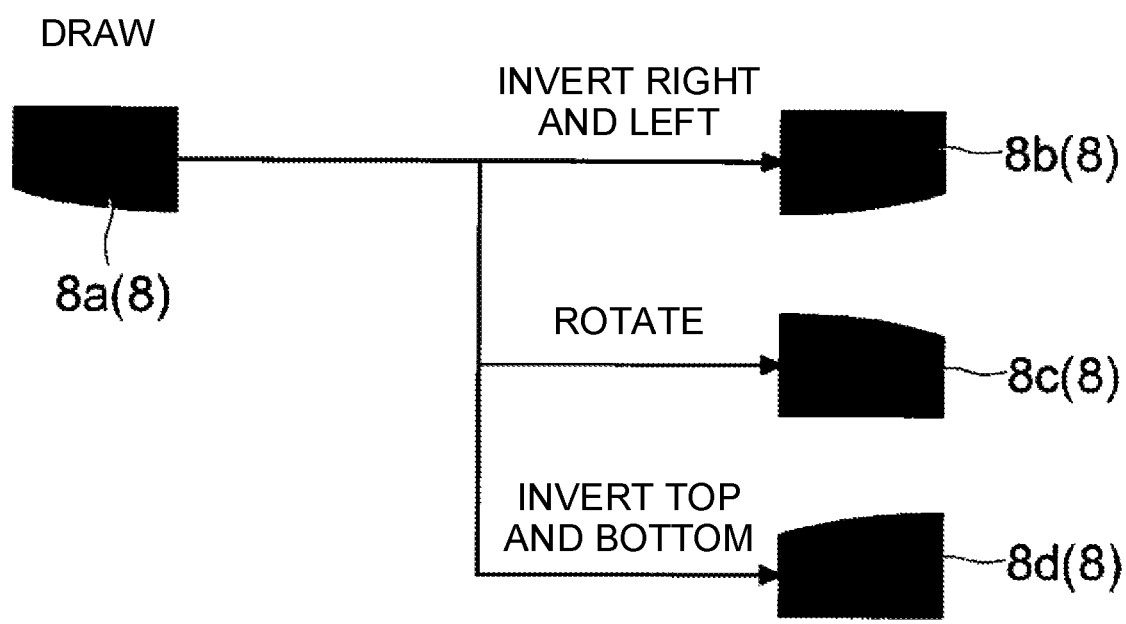
FIG. 12 is a diagram illustrating an example of a character to which an ear-serif according to the embodiment is added.
Figure 13:
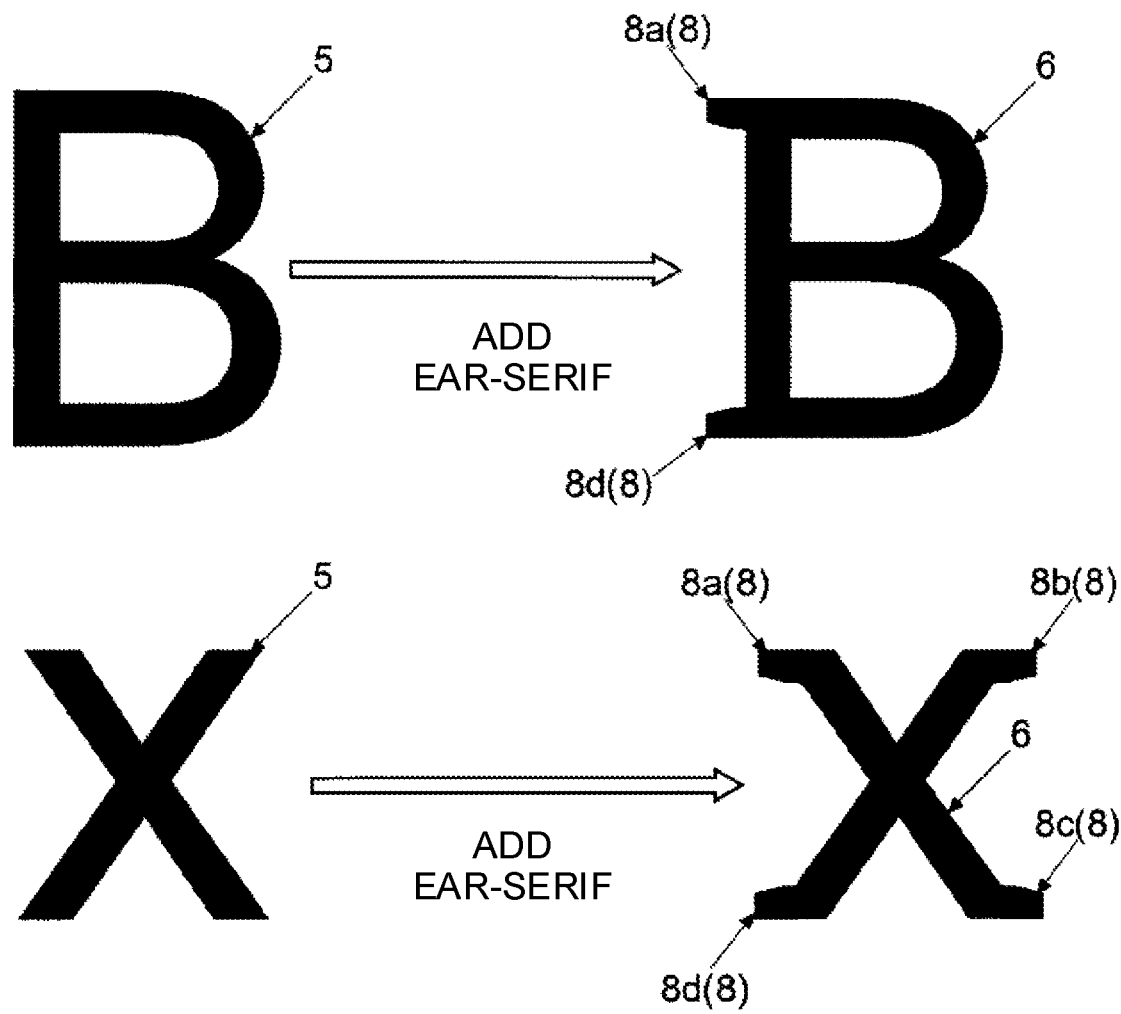
FIG. 13 is a diagram illustrating an example of adding an ear-serif according to the embodiment.

Next, an example of adding an ear-serif, which is one type of serif according to the embodiment, will be described with the use of FIGS. 11 to 13. FIG. 11 is a diagram illustrating an example of a character to which an ear-serif according to the embodiment is added. FIGS. 12 and 13 are diagrams illustrating an example of adding an ear-serif according to the embodiment.

An ear-serif is a serif that protrudes in either the right or left from the end of the line of a character. For a character with an ear-serif, the position where ear-serif image data 8 is added and the type of the ear-serif are defined in the serif data 4b. FIG. 11 illustrates an example of characters (alphabet) of a serif font. In FIG. 11, the ear-serif part added to a character is circled.

When adding the ear-serif, the processor 10 (image processing circuit 16) generates the ear-serif image data 8. The processor 10 generates the ear-serif image data 8 on the basis of a specific algorithm. An example of the method for generating the ear-serif image data 8 will be described with the use of FIG. 12. The figure on the left side of FIG. 12 illustrates an example of the ear-serif to be added to the upper left corner of a character (the upper left end of the character). Hereinafter, the image data of the ear-serif to be added to the upper left corner of the character (the upper left end of the character) is referred to as upper left corner ear-serif image data 8a. The image data of the ear-serif to be added to the upper right corner of the character (the upper right end of the character) is referred to as upper right corner ear-serif image data 8b. The image data of the ear-serif to be added to the lower right corner of the character (the lower right end of the character) is referred to as lower right corner ear-serif image data 8c. The image data of the ear-serif to be added to the lower left corner of the character (the lower left end of the character) is referred to as lower left corner ear-serif image data 8d.

When adding the ear-serif, the processor 10 (image processing circuit 16) draws one of the ear-serifs for the upper left corner, the upper right corner, the lower right corner, and the lower left corner (generation of reference ear-serif image data 8). The hybrid font file 3 includes the drawing definition 51 for drawing a reference ear-serif. The processor 10 (image processing circuit 16) inverts or rotates the generated reference ear-serif image data 8 to generate the other three types of ear-serif image data 8. FIG. 12 illustrates an example of generating the upper left corner ear-serif image data 8a as the reference ear-serif image data.

The upper side of the upper left corner ear-serif is parallel to the right-left direction. The left side and the right side are parallel to the up and down direction. The left side is shorter than the right side. The lower side is a curve that connects the lower end of the left side and the lower end of the right side. The upper left corner ear-serif is a figure in which the lower left corner of a rectangle whose right-left direction is the longitudinal direction is rounded.

As illustrated in FIG. 12, the processor 10 (image processing circuit 16) may invert the right and left of the upper left corner ear-serif image data 8a to generate the upper right corner ear-serif image data 8b. The upper side of the upper right corner ear-serif is parallel to the right-left direction. The left side and the right side are parallel to the up and down direction. The right side is shorter than the left side. The lower side is a curve that connects the lower end of the left side and the lower end of the right side. The upper right corner ear-serif is a figure in which the lower right corner of a rectangle whose right-left direction is the longitudinal direction is rounded.

As illustrated in FIG. 12, the processor 10 (image processing circuit 16) may rotate the upper left corner ear-serif image data 8a by 180 degrees to generate the lower right corner ear-serif image data 8c. The lower side of the lower right corner ear-serif is parallel to the right-left direction. The left side and the right side are parallel to the up and down direction. The right side is shorter than the left side. The upper side is a curve that connects the upper end of the left side and the upper end of the right side. The lower right corner ear-serif is a figure in which the upper right corner of a rectangle whose right-left direction is the longitudinal direction is rounded.

As illustrated in FIG. 12, the processor 10 (image processing circuit 16) may invert the top and bottom of the upper left corner ear-serif image data 8a to generate the lower left corner ear-serif image data 8d. The lower side of the lower left corner ear-serif is parallel to the right-left direction. The left side and the right side are parallel to the up and down direction. The left side is shorter than the right side. The upper side is a curve that connects the upper end of the left side and the upper end of the right side. The lower left corner ear-serif is a figure in which the upper left corner of a rectangle whose right-left direction is the longitudinal direction is rounded.

The above method for generating each ear-serif image data 8 is an example. The processor 10 (image processing circuit 16) may directly draw each ear-serif to generate the ear-serif image data 8 without performing the inversion and rotation processes.

The upper figure in FIG. 13 illustrates an example of adding an upper left corner ear-serif and a lower left corner ear-serif to a sans-serif uppercase letter B. The processor 10 (image processing circuit 16) pastes each ear-serif image data 8 to the sans-serif character data 5 of the uppercase letter B to generate the serif character data 6. The lower figure of FIG. 13 illustrates an example of adding ear-serifs for an upper left corner, an upper right corner, a lower right corner, and a lower left corner to a sans-serif lower case letter x. The processor 10 (image processing circuit 16) pastes a total of four pieces of ear-serif image data 8 to the sans-serif character data 5 of the lowercase letter x to generate the serif character data 6.

The serif data 4b is data in which the type of a serif to be pasted (added) and the position at which the serif is to be pasted (added) are defined for each character to which the serif is added. In the case of the uppercase letter B illustrated in FIG. 13, the serif data 4b defines the upper left corner ear-serif and the lower left corner ear-serif as types of serifs to be pasted to the letter B. In addition, for the uppercase letter B, the upper end of the line in the up and down direction of the left end is defined as the position to paste the upper left corner ear-serif. Moreover, the lower end of the line in the up and down direction of the left end is defined as the position to paste the lower left corner ear-serif.

Even in the case of an ear-serif, as the positions, the coordinates in the sans-serif character data 5 (first reference coordinates) and the coordinates of the ear-serif image data 8 (second reference coordinates) are defined. When pasting the serif image data, the processor 10 (image processing circuit 16) superimposes the defined second reference coordinates on the defined first reference coordinates. Respective coordinates are set in advance in such a manner that serif characters are properly reproduced and that ear-serifs are properly added.

The processor 10 (image processing circuit 16) may store each of the generated ear-serif image data 8 in the font cache area 19a. Once each ear-serif image data 8 is generated, the processor 10 may add the ear-serif image data 8 read out from the font cache area 19a to the sans-serif character data 5 without generating each ear-serif image data 8.

Figure 15:
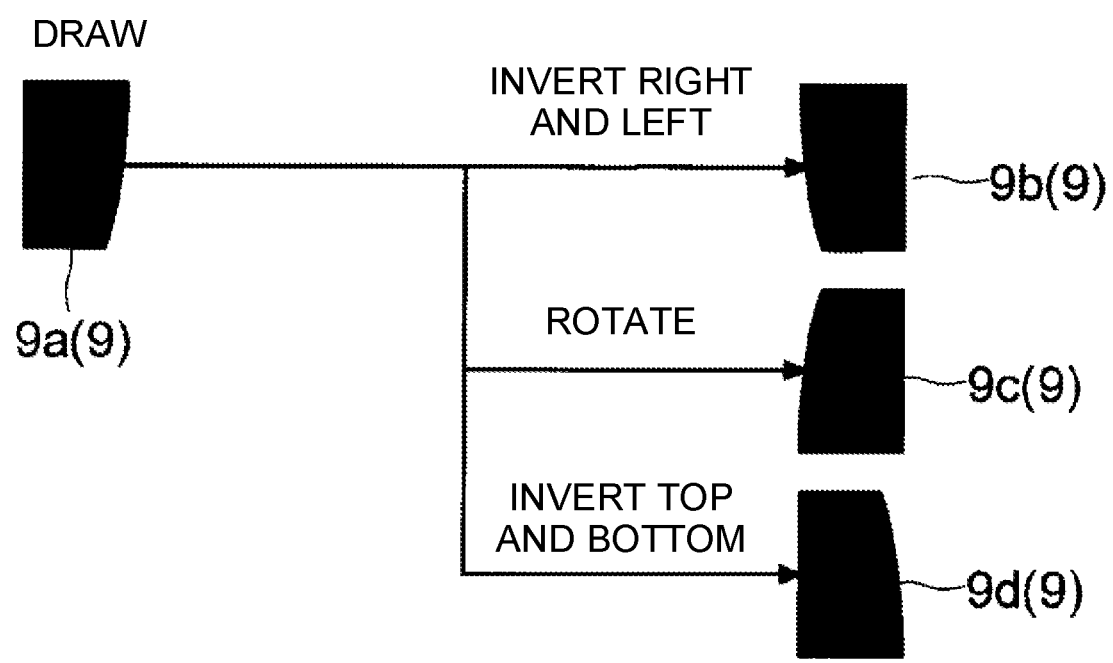
FIG. 15 is a diagram illustrating an example of a character to which a hook-serif according to the embodiment is added.
Figure 16:
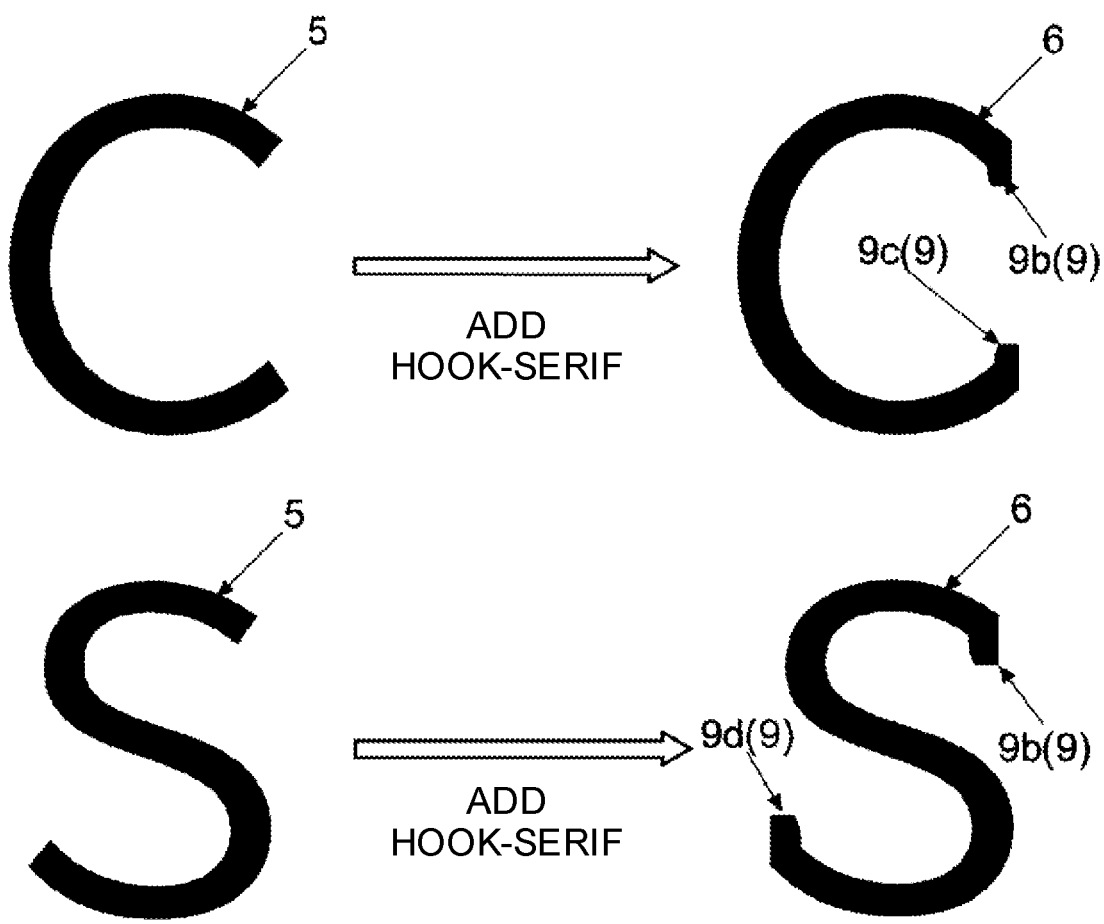
FIG. 16 is a diagram illustrating an example of adding a hook-serif according to the embodiment.

(Hook-Serif)
Next, an example of adding a hook-serif, which is one type of serif according to the embodiment, will be described with the use of FIGS. 14 to 16. FIG. 14 is a diagram illustrating an example of a character to which a hook-serif according to the embodiment is added. FIGS. 15 and 16 are diagrams illustrating an example of adding a hook-serif according to the embodiment.

A hook-serif is a serif that protrudes in either the top or bottom from the end of the line of a character. For a character with a hook-serif, the position where hook-serif image data 9 is added and the type of the hook-serif are defined. FIG. 14 illustrates an example of characters (alphabet) of a serif font. In FIG. 14, a hook-serif part added to a character is circled.

When adding the hook-serif, the processor 10 (image processing circuit 16) generates the hook-serif image data 9. The figure on the left side of FIG. 15 illustrates an example of the hook-serif for the upper left corner of a character (the upper left end of the character). Hereinafter, the image data of the hook-serif for the upper left corner of the character is referred to as upper left corner hook-serif image data 9a. The image data of the hook-serif for the upper right corner of the character (the upper right end of the character) is referred to as upper right corner hook-serif image data 9b. The image data of the hook-serif for the lower right corner of the character (the lower right end of the character) is referred to as lower right corner hook-serif image data 9c. The image data of the hook-serif for the lower left corner of the character (the lower left end of the character) is referred to as lower left corner hook-serif image data 9d.

When adding the hook-serif, the processor 10 (image processing circuit 16) draws image data of one of the hook-serif image data 9 for the upper left corner, the upper right corner, the lower right corner, and the lower left corner (generation of reference hook-serif image data 9). The hybrid font file 3 includes the drawing definition 51 for drawing a reference hook-serif. Then, the processor 10 (image processing circuit 16) inverts or rotates the reference hook-serif image data 9 to generate the other three types of hook-serif image data 9. FIG. 15 illustrates an example of drawing an upper left corner hook-serif as a reference hook-serif.

The left side of the upper left corner hook-serif is parallel to the up and down direction. The upper side and the lower side are parallel to the right-left direction. The upper side is longer than the lower side. The right side is a curve that connects the right end of the upper side and the right end of the lower side. The upper left corner hook-serif is a figure in which the lower right corner of a rectangle whose up and down direction is the longitudinal direction is rounded.

As illustrated in FIG. 15, the processor 10 (image processing circuit 16) may invert the right and left of the upper left corner hook-serif image data 9a to generate the upper right corner hook-serif image data 9b. The right side of the upper right corner hook-serif is parallel to the up and down direction. The upper side and the lower side are parallel to the right-left direction. The upper side is longer than the lower side. The left side is a curve that connects the left end of the upper side and the left end of the lower side. The upper right corner hook-serif is a figure in which the lower left corner of a rectangle whose up and down direction is the longitudinal direction is rounded.

As illustrated in FIG. 15, the processor 10 (image processing circuit 16) may rotate the upper left corner hook-serif image data 9a by 180 degrees to generate the lower right corner hook-serif image data 9c. The right side of the lower right corner hook-serif is parallel to the up and down direction. The upper side and the lower side are parallel to the right-left direction. The upper side is shorter than the lower side. The left side is a curve that connects the left end of the upper side and the left end of the lower side. The lower right corner hook-serif is a figure in which the upper left corner of a rectangle whose up and down direction is the longitudinal direction is rounded.

As illustrated in FIG. 15, the processor 10 (image processing circuit 16) may invert the top and bottom of the upper left corner hook-serif image data 9a to generate the lower left corner hook-serif image data 9d. The left side of the lower left corner hook-serif is parallel to the up and down direction. The upper side and the lower side are parallel to the right-left direction. The upper side is shorter than the lower side. The right side is a curve that connects the right end of the upper side and the right end of the lower side. The lower right corner hook-serif is a figure in which the upper left corner of a rectangle whose up and down direction is the longitudinal direction is rounded.

The above method for generating each hook-serif image data 9 is an example. The processor 10 (image processing circuit 16) may directly draw each hook-serif to generate image data without performing the inversion and rotation processes.

The upper figure in FIG. 16 illustrates an example of adding an upper right corner hook-serif to a sans-serif uppercase letter C. The processor 10 (image processing circuit 16) pastes each hook-serif image data 9 to the sans-serif character data 5 of the uppercase letter C to generate the serif character data 6. The lower figure of FIG. 16 illustrates an example of adding hook-serifs for the upper right corner and lower left corner to a sans-serif uppercase letter S. The processor 10 (image processing circuit 16) pastes two piece of hook-serif image data 9 to the sans-serif character data 5 of the uppercase letter S to generate the serif character data 6.

In the serif data 4b, the type of hook-serif to be pasted (added) and the position at which the hook-serif is to be pasted (added) are defined for each character to which the serif is pasted. In the case of the uppercase letter C illustrated in FIG. 16, the serif data 4b defines the upper right corner hook-serif as the type of a serif to be pasted to the letter C. In addition, out of the sans-serif character data 5 of the letter C, the upper side end of the character is defined as the position to paste the upper right corner hook-serif. At which position the hook-serif image data 9 should be pasted is defined.

Even in the case of a hook-serif, as the positions, the coordinates in the sans-serif character data 5 (first reference coordinates) and the coordinates of the hook-serif image data 9 (second reference coordinates) are defined. When pasting the serif image data, the processor 10 (image processing circuit 16) superimposes the defined second reference coordinates on the defined first reference coordinates. Respective coordinates are set in advance in such a manner that serif characters are properly reproduced and that hook-serifs are properly added.

The processor 10 (image processing circuit 16) may store each of the generated hook-serif image data 9 in the font cache area 19a. Once each hook-serif image data 9 is generated, the processor 10 may add the hook-serif image data 9 read out from the font cache area 19a to the sans-serif character data 5 without generating each hook-serif image data 9.

(Image Forming Apparatus 2)

Figure 17:
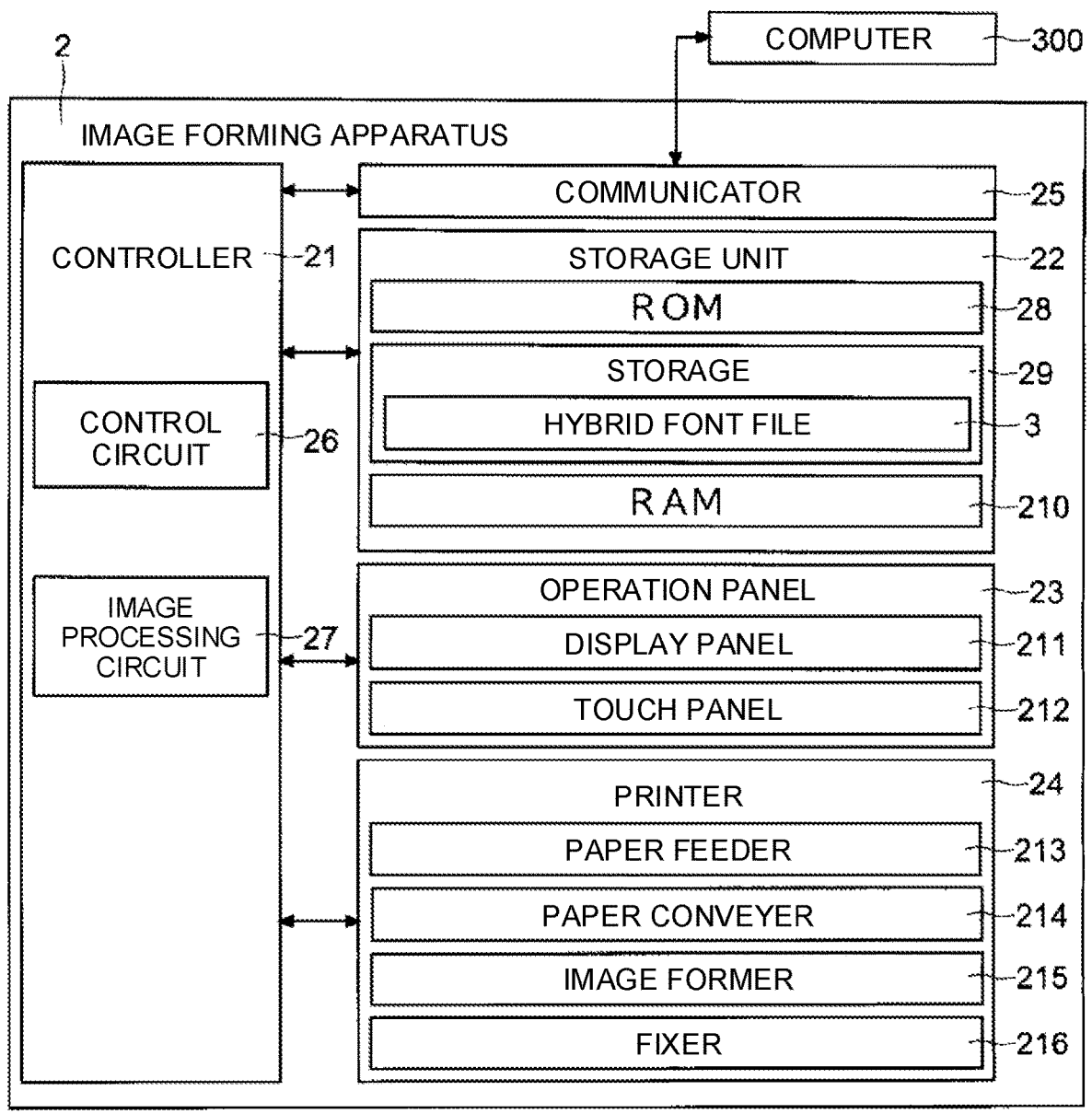
FIG. 17 is a diagram illustrating an example of an image forming apparatus according to the embodiment.

Next, an example of the image forming apparatus 2 according to the embodiment will be described with the use of FIG. 17. FIG. 17 is a diagram illustrating an example of the image forming apparatus 2 according to the embodiment.

The present disclosure can also be applied to the image forming apparatus 2. The image forming apparatus 2 may generate image data of a character at the time of printing. Specifically, the image forming apparatus 2 prints on the basis of print job data transmitted from a computer 300. The print job data may include data in which the print content is described in a page description language. The image forming apparatus 2 generates image data on the basis of the data described in the page description language (rasterizing process). In the rasterizing process, the image forming apparatus 2 generates image data of a character.

In the following description, a printer will be described as an example of the image forming apparatus 2 according to the embodiment. The image forming apparatus 2 is not limited to the printer, and may be a multifunction machine.

The image forming apparatus 2 generates character image data by the same technique as that of the information processing apparatus 100. The printer prints out on the basis of the generated character image data.

The printer includes a controller 21, a storage unit 22, an image reader 3, an operation panel 23, a printer 24, and a communicator 25. The controller 21 controls the operation of the printer. The controller 21 is, for example, a board. The controller 21 includes a control circuit 26 and an image processing circuit 27. The controller 21 can perform the same processing as that of the processor 10.

The control circuit 26 is an integrated circuit that performs control and calculation regarding the printer. The control circuit 26 is, for example, a CPU. The image processing circuit 27 is, for example, an ASIC for image processing. The storage unit 22 stores programs and data for the control. The storage unit 22 includes a ROM 28, a RAM 210, and a storage 29. The storage 29 is, for example, an HDD or an SSD. The control circuit 26 performs printer control and calculation on the basis of the programs and data in the storage unit 22.

The operation panel 23 includes a display panel 211 and a touch panel 212. The controller 21 causes the display panel 211 to display various setting screens 40 and operation images. The operation images are, for example, buttons, keys, and tabs. The touch panel 212 is attached to the display panel 211. The touch panel 212 detects a touch position. The controller 21 recognizes the operation images on the basis of the output of the touch panel 212. By operating the operation panel 23, various settings related to a job can be set.

The printer 24 includes a paper feeder 213, a paper conveyer 214, an image former 215, and a fixer 216. The controller 21 controls printing-related processes such as paper feeding, paper conveyance, toner image formation, transfer, and fixing. The paper feeder 213 includes a paper feed roller and a paper feed motor. The paper feed motor rotates the paper feed roller. At the time of a print job, the controller 21 rotates the paper feed motor (paper feed roller). With this, a paper is supplied from the paper feeder 213. The paper conveyer 214 includes a conveyance roller pair and a conveyance motor. The conveyance roller pair conveys the paper. The conveyance motor rotates the conveyance roller pair. At the time of a print job, the controller 21 rotates the conveyance motor to cause the paper conveyer 214 to convey a paper.

The image former 215 includes, for example, a photosensitive drum, a charging device, an exposure device, a developing device, and a transfer roller. The controller 21 causes the image former 215 to form a toner image on the basis of output image data. The fixer 216 includes a heater, a heating rotor, a pressure rotor, and a fixing motor. The heater heats the heating rotor. The paper passes through the nip of the heating rotor and the pressure rotor. This makes a toner image fix on the paper. At the time of a print job, the controller 21 causes the fixer 216 to fix the toner image. The paper conveyer 214 ejects a printed paper to the outside of the machine.

The communicator 25 includes various sockets for communication, a circuit for communication, and software for communication. The communicator 25 communicates with the computer 300 via a network. The computer 300 is, for example, a PC or a server. The communicator 25 receives the print job data transmitted from the computer 300. The print job data includes the data described in a page description language. The image processing circuit 27 analyzes the data described in the page description language and generates image data (rasterizing process). The controller 21 causes the printer 24 to perform printing based on the generated image data.

At the time of the rasterizing process, the controller 21 generates character image data with the use of the hybrid font file 3 corresponding to the font selected in the page description language. The storage unit 22 stores a plurality of hybrid font files 3. In FIG. 17, for convenience, only one hybrid font file 3 is illustrated. The hybrid font file 3 stored in the storage unit 22 includes the type face data 4a and the serif data 4b.

When a sans-serif font corresponding to the hybrid font file 3 is selected in advance in the page description language, the controller 21 (image processing circuit 27) generates the sans-serif character data 5 on the basis of the type face data 4a. The controller 21 causes the printer 24 to print out the generated sans-serif character data 5. When a serif font corresponding to the hybrid font file 3 is selected in advance in the page description language, the controller 21 generates the sans-serif character data 5 on the basis of the type face data 4a. Then, the controller 21 generates the serif image data on the basis of the serif data 4b. The controller 21 adds the serif image data to the generated sans-serif character data 5 to generate the serif character data 6. The controller 21 causes the printer 24 to print out the generated serif character data 6.

The process performed by the controller 21 in generating the sans-serif character data 5 and the serif character data 6 is the same as that of the processor 10. The description of the information processing apparatus 100 described above can be applied.

In this way, the information processing apparatus 100 according to the embodiment includes the storage unit 11 and the processor 10. The storage unit 11 stores the font file (hybrid font file 3) including the type face data 4a and the serif data 4b. When a sans-serif font corresponding to the font file (hybrid font file 3) is selected in advance, the processor 10 generates the sans-serif character data 5 which is image data of a sans-serif character on the basis of the type face data 4a. When a serif font corresponding to the font file (hybrid font file 3) is selected in advance, the processor 10 generates the serif image data. The processor 10 adds the serif image data to the sans-serif character data 5 generated on the basis of the type face data 4a to generate the serif character data 6. The processor 10 outputs the generated character image data. The type face data 4a includes, for each character, the drawing definition 51 for drawing a sans-serif character. The serif data 4b is data in which the type of a serif to be added and the position at which the serif is to be added are defined for each character. The serif character data 6 is the image data of a serif character.

The data for generating the serif image data and the data for generating the sans-serif image data are integrated into one font file (hybrid font file 3). With one font file, it is possible to generate both image data of a serif character and image data of a sans-serif character. The data size can be made smaller than a case where font data is stored separately for serif and sans serif. A non-volatile storage area can be used efficiently. In addition, the number of font files is reduced, and thus it is easy to manage font files. Some fonts require payment of usage fees. Two types of fonts can be used by the usage fee of one font.

In addition, the present disclosure is efficient for a font developer (designer). For each of serif and sans serif, it is not necessary to define the data for drawing for each character. A serif can be used only by defining the type of a serif and a place to add the serif. In addition, the present disclosure can also be applied to an existing font file. By simply adding the serif data 4b to existing sans-serif font data, it is possible to provide a font file that supports both serifs and sans-serifs.

When generating the serif character data 6 with a horizontal serif protruding in both right and left directions from an end of a line of a character, the processor 10 draws a bisection image. The processor 10 copies image data of the bisection image (bisection image data 70). The processor 10 combines original image data of the bisection image with image data of the inverted image obtained by inverting the bisection image in a right-left direction after copying (inverted image data 70a) to generate the horizontal serif image data 7. The bisection image is an image obtained by dividing the horizontal serif into two vertically at a center in the right-left direction.

When generating the serif character data 6 with a horizontal serif, the processor 10 adds the upper end horizontal serif image data 72 based on the horizontal serif image data 7 to an upper end of a line of a character included in the sans-serif character data 5. The processor 10 adds the lower end horizontal serif image data 71 based on the horizontal serif image data 7 to a lower end of a line of a character included in the sans-serif character data 5. The image data of a character with a horizontal serif can be easily generated. The shape of the horizontal serif can be changed between the upper end and the lower end. It is possible to obtain the serif character data 6 in which a horizontal serif is added at a required position.

When generating the serif character data 6 with a vertical serif protruding in both up and down directions from an end of a line of a character, the processor 10 rotates the horizontal serif image data 7 by 90 degrees to generate the vertical serif image data 73. The processor 10 adds the generated vertical serif image data 73 to an end of a line of a character included in the sans-serif character data 5. The image data of a character with a horizontal serif can be easily generated. It is possible to obtain the serif character data 6 in which a horizontal serif is added at a required position.

When generating the serif character data 6 with an ear-serif protruding in either right or left direction from an end of a line of a character, the processor 10 generates the upper left corner ear-serif image data 8a, upper right corner ear-serif image data 8b, lower right corner ear-serif image data 8c, and lower left corner ear-serif image data 8d. The processor 10 adds the ear-serif image data 8 of a defined type to a place defined by the serif data 4b, in the image data of the sans-serif character data 5. The image data in which an ear-serif is added to the end of the line (stroke) of a character can be easily generated. It is possible to obtain the serif character data 6 in which an ear-serif is added at a required position.

When generating the serif character data 6 with a hook-serif protruding in either up or down direction from an end of a line of a character, the processor 10 generates the upper left corner hook-serif image data 9a, upper right corner hook-serif image data 9b, lower right corner hook-serif image data 9c, and lower left corner hook-serif image data 9d. The processor 10 adds the hook-serif image data 9 of a defined type to a place defined by the serif data 4b, in the image data of the sans-serif character data 5. The image data in which a hook-serif is added to the end of the line (stroke) of a character can be easily generated. It is possible to obtain the serif character data 6 in which a hook-serif is added at a required position.

The information processing apparatus 100 includes the font cache area 19a that caches the sans-serif character data 5 and the serif image data. If a sans-serif font is selected in advance, and when the sans-serif character data 5 of a character to be output is cached in the font cache area 19a, the processor 10 does not generate the sans-serif character data 5 of the character, and performs an output with a use of the sans-serif character data 5 being cached. If a serif font is selected in advance, and when the sans-serif character data 5 of the character to be output is cached in the font cache area 19a, the processor 10 does not generate the sans-serif character data 5 of the character and uses the sans-serif character data 5 being cached and the serif image data to generate the serif character data 6. The sans-serif character data 5 and the serif image data can be cached. The serif character data 6 can be obtained by pasting the cached serif image data onto the cached sans-serif character data 5. It is possible to quickly generate the serif character data 6. Even if the serif character data 6 and sans-serif character data 5 are mixed in a page, it is possible to quickly prepare image data for each character in the page.

The information processing apparatus 100 includes the display 12. When the sans-serif character data 5 is generated, the processor 10 causes the display 12 to display a sans-serif character on the basis of the generated sans-serif character data 5. When the serif character data 6 is generated, the processor 10 causes the display 12 to display a serif character on the basis of the generated serif character data 6. The display output based on the generated character image data can be performed. It is possible to display a screen on which a font desired by a user is used.

The image forming apparatus 2 according to the embodiment includes the printer 24, storage unit 22, and controller 21. The storage unit 22 includes the font file (hybrid font file 3) including the type face data 4a and the serif data 4b. When a sans-serif font corresponding to the font file (hybrid font file 3) is selected in advance, the controller 21 generates the sans-serif character data 5 which is image data of a sans-serif character on the basis of the type face data 4a, and outputs the generated sans-serif character data 5. When a serif font corresponding to the font file (hybrid font file 3) is selected in advance, the controller 21 generates the serif image data. The controller 21 adds the serif image data to the sans-serif character data 5 generated on the basis of the type face data 4a to generate the serif character data 6. The controller 21 prints out the generated serif character data 6. The type face data 4a includes, for each character, the drawing definition 51 for drawing a sans-serif character. The serif data 4b is data in which the type of a serif to be added and the position at which the serif is to be added are defined for each character. With one hybrid font file 3, it is possible to create both image data of a serif character and image data of a sans-serif character. The size of non-volatile data in the image forming apparatus 2 can be made smaller than a case where the file (font data) for a sans-serif version and the file (font data) for a serif version are stored individually. The non-volatile storage area of the image forming apparatus 2 can be efficiently used. In addition, since the number of font data can be reduced, it becomes easier to manage font data. Moreover, some fonts cannot be used without paying the usage fee. According to the present disclosure, multiple types of fonts can be used by paying the usage fee for one font.

Although the embodiment of the present disclosure has been described, the scope of the present disclosure is not limited to the embodiment, and various variations can be practiced without departing from the spirit of the disclosure.

The present disclosure can be used for an information processing apparatus and an image forming apparatus.

What is claimed is:

1. An information processing apparatus comprising:
   a storage unit configured to store a font file including type face data and serif data; and
   a processor configured to generate sans-serif character data which is image data of a sans-serif character on a basis of the type face data when a sans-serif font corresponding to the font file is selected in advance; to generate serif image data and to add the serif image data to the sans-serif character data generated on a basis of the type face data to generate serif character data when a serif font corresponding to the font file is selected in advance; and to output generated character image data,
   wherein the type face data includes, for each character, a drawing definition for drawing a sans-serif character,
   wherein the serif data is data in which a type of the serif to be added and a position at which the serif is to be added are defined for each character,
   wherein when generating the serif character data with a horizontal serif protruding in both right and left directions from an end of a line of a character, the processor draws a bisection image, copies image data of the bisection image, combines original image data of the bisection image with image data of an inverted image obtained by inverting the bisection image in a right-left direction after copying, to generate horizontal serif image data, and
   wherein the bisection image is an image obtained by dividing the horizontal serif into two vertically at a center in the right-left direction.

2. The information processing apparatus according to claim 1, wherein when generating the serif character data with the horizontal serif, the processor adds upper end horizontal serif image data based on the horizontal serif image data to an upper end of a line of a character included in the sans-serif character data, and adds lower end horizontal serif image data based on the horizontal serif image data to an lower end of a line of a character included in the sans-serif character data.

3. The information processing apparatus according to claim 1, wherein when generating the serif character data with a vertical serif protruding in both up and down directions from an end of a line of a character, the processor rotates the horizontal serif image data by 90 degrees to generate vertical serif image data, and adds the vertical serif image data generated to an end of a line of a character included in the sans-serif character data.

4. The information processing apparatus according to claim 1, wherein when generating the serif character data with an ear-serif protruding in either right or left direction from an end of a line of a character, the processor generates upper left corner ear-serif image data, upper right corner ear-serif image data, lower right corner ear-serif image data, and lower left corner ear-serif image data, and adds ear-serif image data of a defined type to a place defined by the serif data, in the image data of the sans-serif character data.

5. The information processing apparatus according to claim 1, wherein when generating the serif character data with a hook-serif protruding in either up or down direction from an end of a line of a character, the processor generates upper left corner hook-serif image data, upper right corner hook-serif image data, lower right corner hook-serif image data, and lower left corner hook-serif image data, and adds the hook-serif image data of a defined type to a place defined by the serif data, in the image data of the sans-serif character data.

6. The information processing apparatus according to claim 1, further comprising a display,
- wherein when the sans-serif character data is generated, the processor causes the display to display a sans-serif character on a basis of the sans-serif character data generated, and
- when the serif character data is generated, the processor causes the display to display a serif character on a basis of the serif character data generated.

7. An information processing apparatus comprising:
- a storage unit configured to store a font file including type face data and serif data;
- a processor configured to generate sans-serif character data which is image data of a sans-serif character on a basis of the type face data when a sans-serif font corresponding to the font file is selected in advance; to generate serif image data and to add the serif image data to the sans-serif character data generated on a basis of the type face data to generate serif character data when a serif font corresponding to the font file is selected in advance; and to output generated character image data; and
- a font cache area for caching the sans-serif character data,
- wherein the type face data includes, for each character, a drawing definition for drawing a sans-serif character,
- wherein the serif data is data in which a type of the serif to be added and a position at which the serif is to be added are defined for each character, and
- wherein if the sans-serif font is selected in advance, and when the sans-serif character data of a character to be output is cached in the font cache area, the processor does not generate the sans-serif character data of the character, and performs an output with a use of the sans-serif character data being cached; and if the serif font is selected in advance, and when the sans-serif character data of a character to be output is cached in the font cache area, the processor does not generate the sans-serif character data of the character and adds the serif image data to the sans-serif character data being cached to generate serif character data.

8. An image forming apparatus comprising:
- a printer;
- a storage unit configured to store a font file including type face data and serif data; and
- a controller configured to generate sans-serif character data which is image data of a sans-serif character on a basis of the type face data when a sans-serif font corresponding to the font file is selected in advance; to generate serif image data and to add the serif image data to the sans-serif character data generated on a basis of the type face data to generate serif character data, when a serif font corresponding to the font file is selected in advance; and to print out generated character image data,
- wherein the type face data includes, for each character, a drawing definition for drawing a sans-serif character, and
- wherein the serif data is data in which a type of the serif to be added and a position at which the serif is to be added are defined for each character,
- wherein when generating the serif character data with a horizontal serif protruding in both right and left directions from an end of a line of a character, the controller draws a bisection image, copies image data of the bisection image, combines original image data of the bisection image with image data of an inverted image obtained by inverting the bisection image in a right-left direction after copying, to generate horizontal serif image data, and
- wherein the bisection image is an image obtained by dividing the horizontal serif into two vertically at a center in the right-left direction.

\* \* \* \* \*